July 29, 1930.  A. DINA  1,771,748
BRACKET FOR PROJECTION MACHINE SHUTTERS
Filed June 5, 1929  5 Sheets-Sheet 1

Inventor
Augusto Dina
By his Attorney
Howard W. Dix

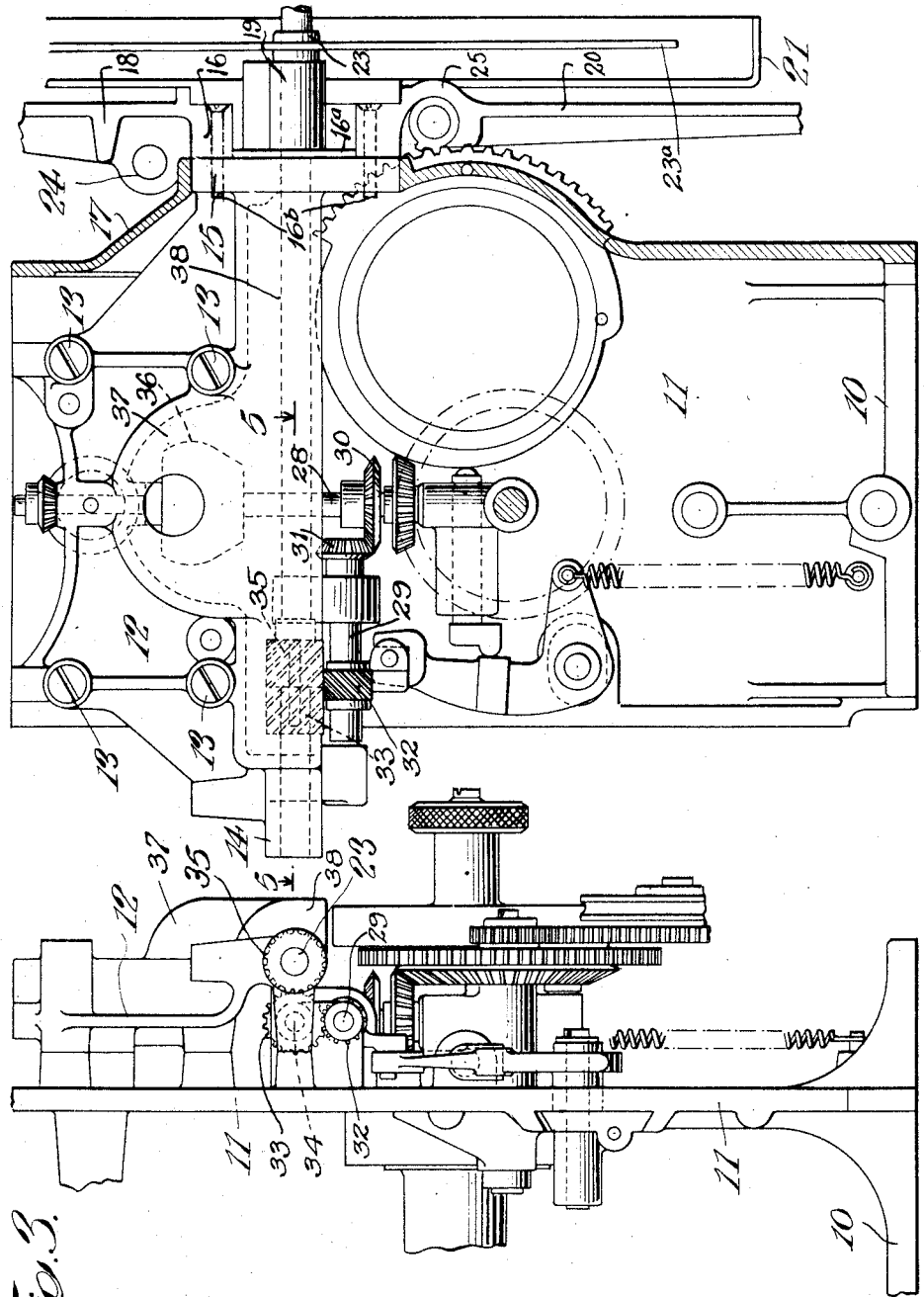

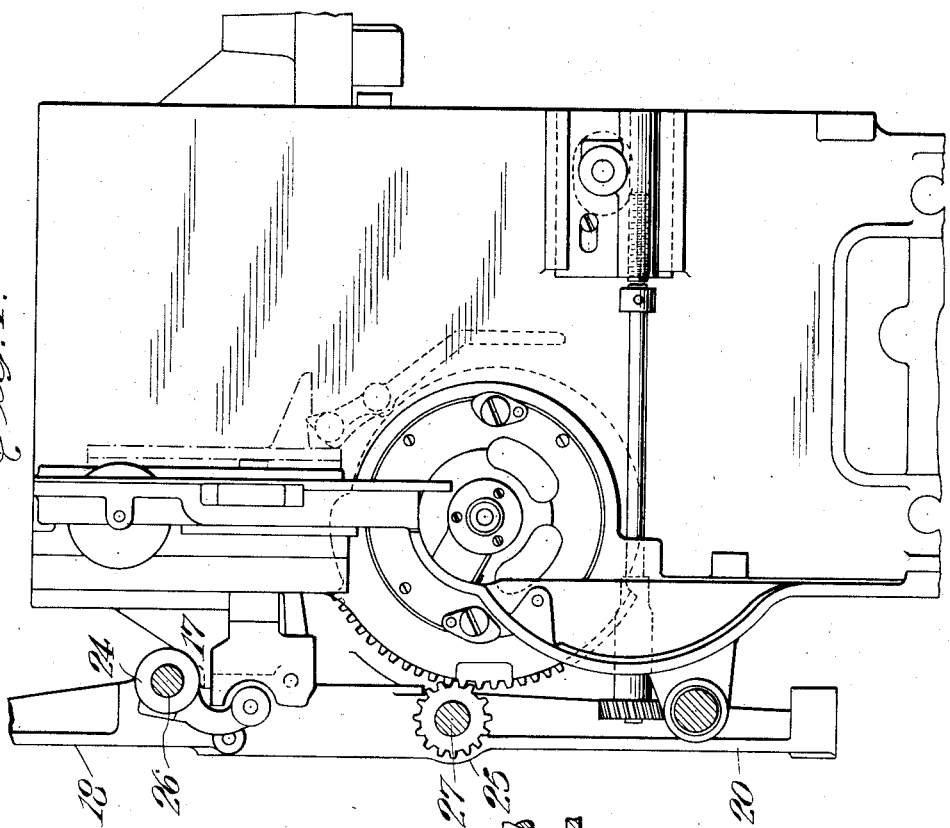
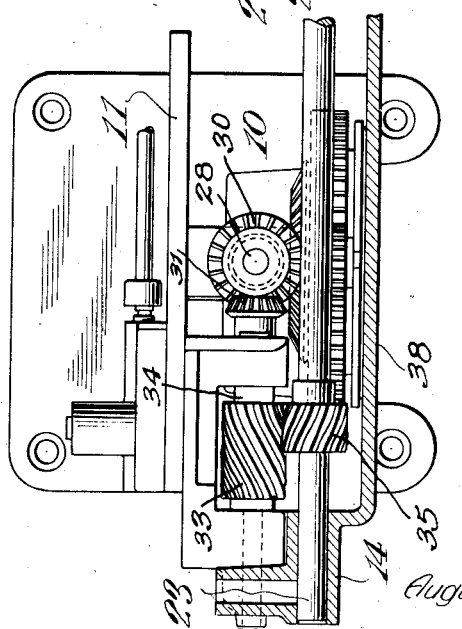

July 29, 1930.   A. DINA   1,771,748
BRACKET FOR PROJECTION MACHINE SHUTTERS
Filed June 5, 1929   5 Sheets-Sheet 4
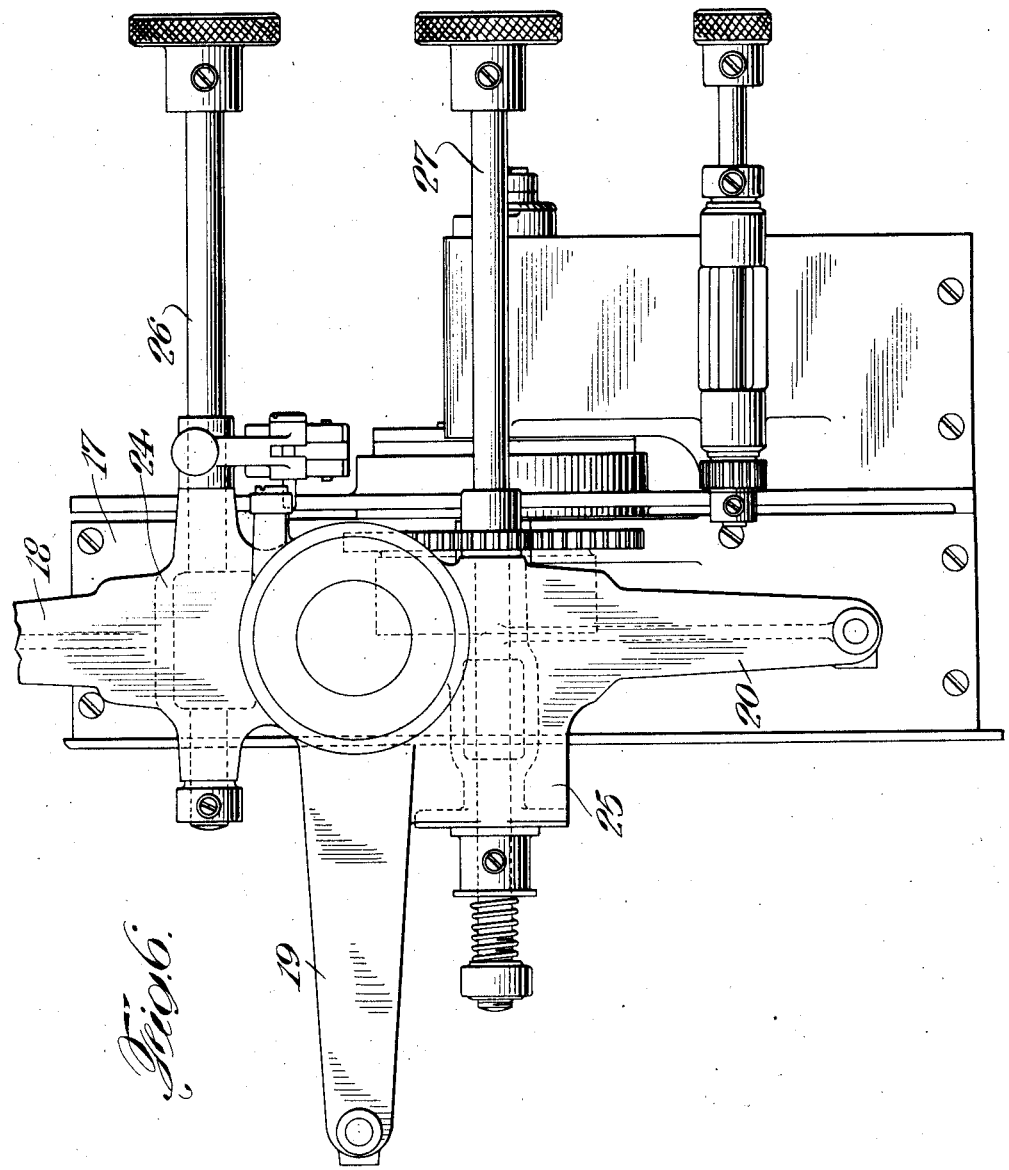
Inventor
Augusto Dina
By his Attorney

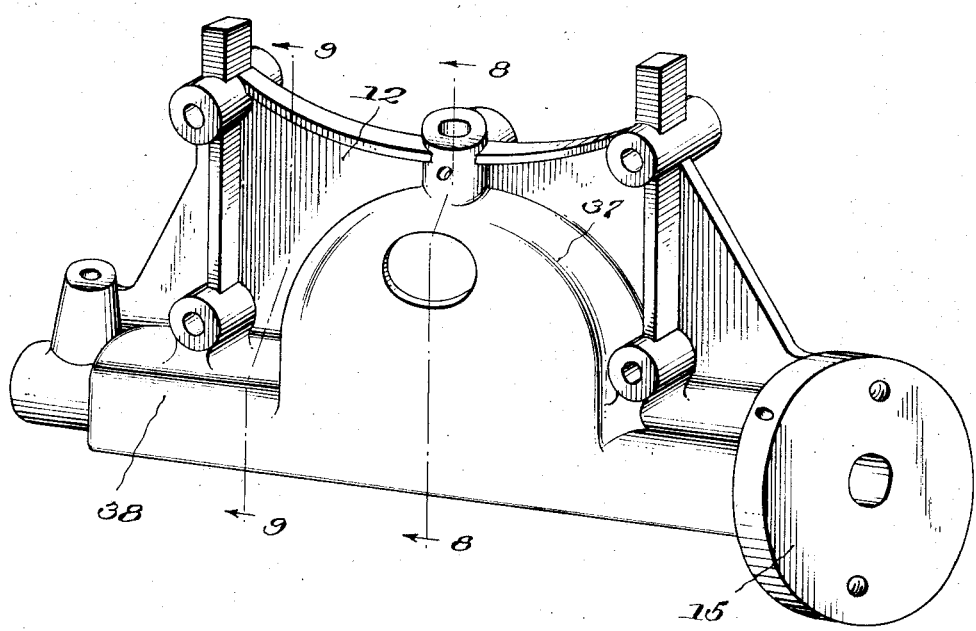
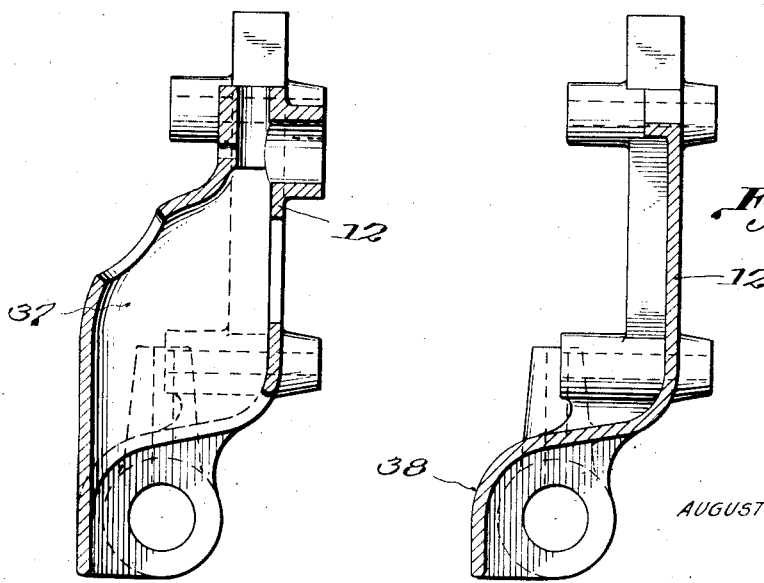

Patented July 29, 1930

1,771,748

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

BRACKET FOR PROJECTION-MACHINE SHUTTERS

Application filed June 5, 1929. Serial No. 368,481.

This invention relates to projection machines and has particular reference to motion picture projectors and is especially concerned with the mounting of the shutter and the shutter guard plates.

A main object of the invention is to provide a compact, rugged, and strong supporting member for the shutter shaft and the shutter guard plates and to so mechanically associate the same to the supporting plate for the rest of the mechanism within the projecting head that the shutter is rigidly supported without any tendency to vibrate and the associated parts are kept in proper alignment.

A further object is to provide the shutter shaft support with means whereby several adjustments for some of the mechanism within the projection head, such as the film gate and the framing mechanism, are supported therefrom and actuated from the outside of the head.

A still further object is to provide a shutter construction and support which will enable the shutter to be disposed at the rear of the projection head, be firmly supported as above mentioned, and be operated from the ordinary standard driving and shutter-adjusting mechanism of the machine without requiring that such mechanism be altered or re-arranged in any material manner.

Further and more-specific objects, features, and advantages will more clearly appear when taken in connection with the accompanying drawings which form part of the specification and illustrate one embodiment of the invention, and in which, Fig. 1 is a side elevation of the projection head with the doors open and showing the manner of attaching the shutter shaft support to the supporting plate within the head;

Fig. 2 is an enlarged sectional view of the same side of the machine, showing more of the details;

Fig. 3 is an end elevation of the mechanism shown in Fig. 2;

Fig. 4 is an enlarged elevation from the opposite side, showing the shutter shaft supporting spider and the manner in which the film gate and framing adjustment members are mounted thereon;

Fig. 5 is a horizontal view partly in section and taken on the line 5—5 of Fig. 2; and, Fig. 6 is an enlarged transverse section looking toward the front of the machine and showing the spider and the framing and film gate adjustments thereon.

Fig. 7 is a perspective view of the supporting casting;

Fig. 8 is a transverse vertical section thereof taken on the line 8—8 of Fig. 7; and Fig. 9 is a similar section taken on the line 9—9 of Fig. 7.

Figure 1:
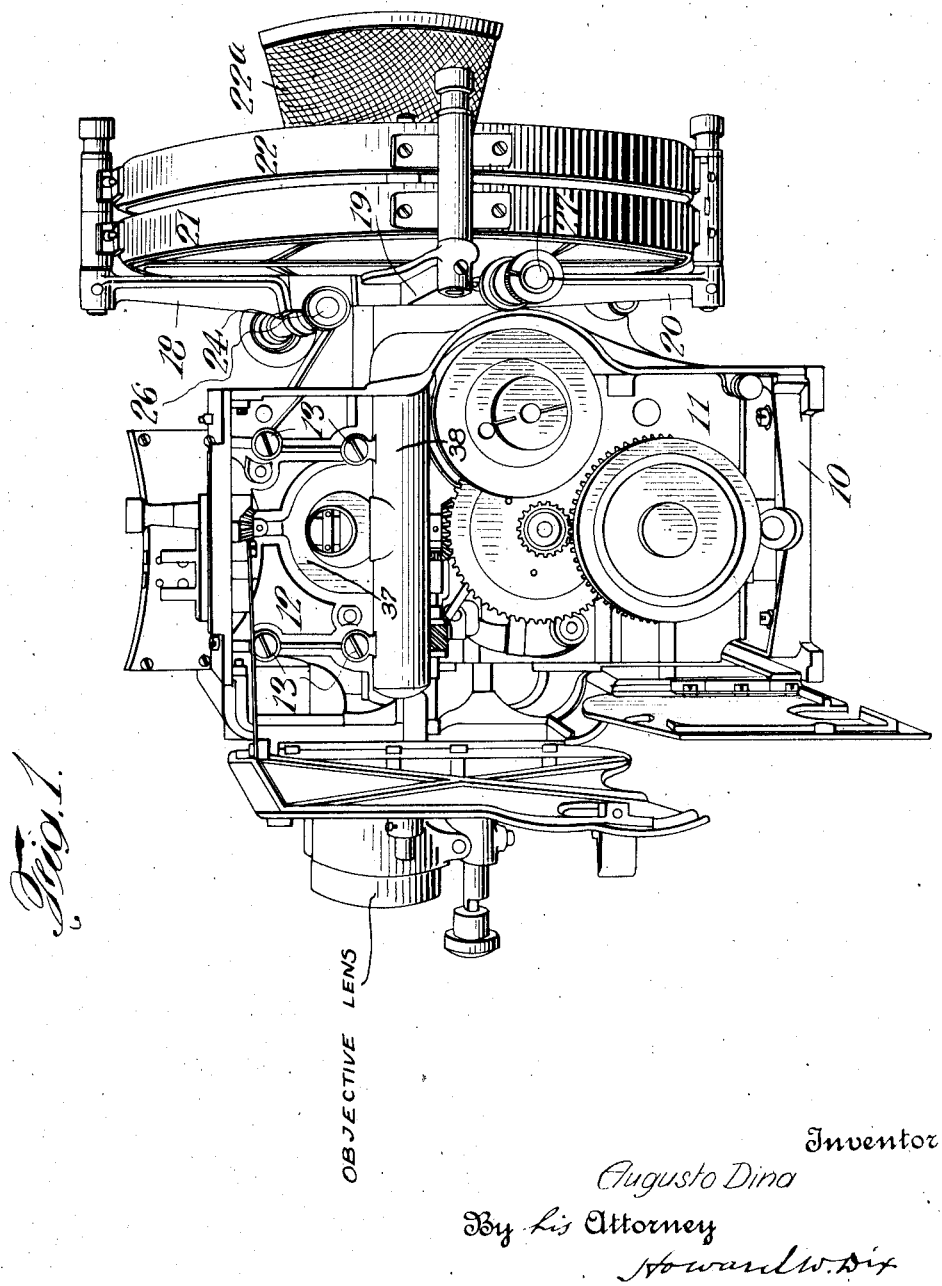

In a general consideration of the invention, it is associated with the projection head of the machine which in turn is usually provided with a central vertical plate or partition fastened to the base plate of the head and which vertical plate has mounted thereon most of the mechanism. This mechanism is usually separately mounted from and is not supported from the enveloping casing. In accordance with the present invention, a single piece casting is preferably fastened at widely spaced points to one side of the partition or vertical plate to secure its rigidity, and has formed thereon journal elements for the shutter shaft and a bearing for the shutter guard plate-supporting spider. This single piece casting is preferably curved or belled in shape intermediate its length to extend over considerable of the mechanism and to act as a cover therefor. This casting or support is rigidly fastened to the partition or vertical plate. No other support for the shaft and the guard plates is required, thereby eliminating the necessity of in any way supporting these members from the casing. Therefore the main parts of the casing are capable of being removed without in any way disturbing the mechanical relation of the shaft and the guard plates to the rest of the mechanism. Also because of the rigidity and compactness of the unit, the vibration ordinarily encountered is absent. By reason also of the rigidity of the structure, the framing and the film gate adjustments may be and preferably are safely mounted outside of the machine on the guard plate spider.

In further general contemplation of the invention, it will be noted that the shutter shaft is supported and directed to extend from the rear of the projector head so that it will be disposed at the rear of the aperture plate. This novel direction of support is achieved by means of the particular support above referred to and enables the shutter shaft in its new position to function properly and yet be clear of all the other mechanism which is standard to the usual operation of the machine for the movement of the film and the shutter in synchronism with each other. It is also apparent that the shutter shaft is driven and adjusted from the usual standard driving and adjusting mechanism altho disposed in this new position. Thus, without altering the mechanical construction and operation of the film and shutter operating and adjusting mechanism of the standard machine, a shutter disposed at the rear of the head is provided and operated in perfect synchronism with the other mechanisms.

The present preferred form of the invention is shown in the drawings in which a projection head is shown as having a base plate 10 and a vertically extending partition plate 11 extending upwardly from the base plate 10 and in a longitudinal direction between the lateral edges of the base plate. On this partition plate 11 is supported practically all of the mechanism ordinarily contained within the projection head of the machine.

Now the problem has been as to how the shutter shaft and any associated mechanism could be very rigidly supported from the plate 11 without disturbing the usual arrangement and disposition of the said mechanism and without preventing proper access to the mechanism whenever that became necessary.

To achieve this there is provided a casting which along its upper part is in the form of a flat plate 12 which has at widely spaced points, holes for heavy bolts such as 13 whereby it may be securely bolted to the side of the partition plate 11. On its lower portion along its length, the casting is flared out as seen in Figs. 1, 2, and 3 to clear and be spaced from adjacent mechanism and to act somewhat as a cover therefor in addition. At its front end the casting is provided with a journal 14 for the front end of the shutter shaft and at its rear end is enlarged as shown at 15 to form a journal for the shutter shaft 23 and a support or bearing portion for a hub 16 abutting thereto. The outside of the enlarged journal and bearing portion 15 is properly tooled or machined to form a seat for that part 17 of the casing which covers this portion of the interior mechanism. The hub 16 may be properly spaced relative to the portion 15 by suitable shims 16ª or similar devices if desired. The hub 16 is fastened with its rear face abutting the adjacent face of bearing portion 15 by means of bolts 16ᵇ extending from the hub 16 into the enlarged bearing portion 15. This alinement is to permit the shaft of the shutter and the guard plate spider to be moved lengthwise to bring the shutter near the film aperture opening or to dispose it further therefrom as may be the case. This lengthwise adjustment can be effected without disturbing the other mechanism and without moving the casting after it has once been rigidly connected to the partition 11.

Reference to Figs. 2 and 3 of the drawings, will clearly indicate to one familiar with motion picture projectors, that the left end of the shutter shaft 23 is connected to the usual standard shutter driving and adjusting mechanism, which in previous instances has been used to drive and adjust shutters projecting from the front of the head. In the present case, however, the shutter is so supported that it can be disposed to the rear of the head altho it is apparent that the shutter shaft 23 can be further extended to the left of the journal 14 to mount a shutter on its left end at the front of the head as well if desired. It is therefore apparent that the standard shutter driving and adjusting mechanism is employed to drive and adjust this novel shutter at the rear of the head and that without any material alteration of its construction.

This hub 16 has integrally formed on its forward face three outwardly extending spaced arms 18, 19, and 20, the other ends of which are bored to receive shafts on which are slidably mounted shutter guard plates 21 and 22. The enlarged bearing portion 15 is bored to receive and act as a journal for the shutter shaft 23 which extends between the guard plates 21 and 22 and carries on its end the shutter 23ª. The front end of the shaft 23 is borne in the journal 14 previously mentioned.

As shown in Fig. 2, the spider arms for the shutter guard plates 21 and 22 are provided with journals such as 24 and 25, the former supporting the shaft of the film gate adjusting shaft 26, and the latter supporting the framing adjustment shaft 27. These shafts are connected, in a manner not concerned with this invention, with their related and appropriate mechanism to perform these respective functions. These spider arms 21 and 22 also support one or more light screens or guards such as 22ª which, as described in my co-pending application Serial Number 351,206, filed March 30, 1929, and entitled light guards for motion picture projection machines act to protect the operator from the intense light from the beam and its back reflection from the shutter and the aperture plate.

The standard or ordinary mechanism supported on the partition 11, and which the casting member is constructed and arranged to clear, comprises ordinarily a vertical main drive shaft 28, and a counter shaft with engaging beveled gears 30 and 31. Counter shaft 29 has a worm 32 meshing with a worm 33 on a shaft 34 which in the ordinary machine is adapted to project through to the front of the machine and support a shutter. The worm 33 in this modification meshes with the worm 35 on the auxiliary shutter shaft 23, above mentioned.

The casting member itself, shown in detail in Figs. 7, 8 and 9, comprises essentially a flat plate 12 with the upper central curved cup shaped portions 37 and the lower curved flared edge portion 38, the opposite ends of which are disposed to act as journals for the shaft 23 and the right hand end of which is enlarged to form the bearing portion 15.

Thus it is apparent that the partition plate, the main support for the mechanism, within the projection head, is intimately and rigidly connected to the shutter shaft and the shutter guard plate to form a complete, compact ensemble, which, in operation, will be entirely free from the vibration which is so detrimental to successful operation. Furthermore, the unit is securely attached to the supporting partition plate 11 without in any way interfering with the disposition and arrangement and operaton of the mechanism already disposed on said partition plate. The unit thus rigidly connected to the machine supports essential adjusting mechanisms which require unusual rigidity for successful operation, as well as acting as a most secure journal for the shutter shaft and the shutter and its guard plates.

It will be seen therefore, that the invention as constituted comprises a supporting casting securely and rigidly fastened to the partition plate and its ends provided with journals for the shutter shaft; that the one end of the casting is enlarged to support the hub which is integral with the guard plate spider; that the hub also forms an integral support for the guard plate spider thus increasing the rigidity of the ensemble; that the spider also acts as a support for the several adjustment mechanisms which require absolute rigidity and stability for successful operation and function; and that the shaft and the spider can, by means of the shims, be adjusted longitudinally to reposition the spider and the shutter as desired.

While the invention has been described in detail and with respect to a preferred form thereof, it is to be understood that it is not to be limited to such details or forms since many changes and modifications may be made and the invention embodied in other forms without departing from the spirit and scope of the invention in its broader aspects. Hence it is desired to cover any and all forms and modifications coming within the language and scope of any one or more of the appended claims.

What is claimed, is:

1. A motion picture machine having an operating head, a shutter positioned at the rear of said head, a shaft for supporting and rotating said shutter, a guard for said shutter, and a shaft supporting member engaging with said head at a plurality of points spaced apart, said member also supporting said guard.

2. A motion picture machine having an operating head, a shutter positioned at the rear of said head, a shaft for supporting and rotating said shutter, a guard for said shutter, and a shaft supporting member engaging with said head at a plurality of points spaced apart, said member also supporting said guard, and means for adjusting the shaft and the guard lengthwise without moving the supporting member.

3. In combination with a motion picture projecting machine adapted for front shutter operation and having a shutter driving mechanism, a support attachable to said machine, an auxiliary shutter shaft mounted on said support and extending to the rear of the machine, driving means for connecting said auxiliary shutter shaft to said shutter driving mechanism, and a demountable casing on said machine for surrounding said mechanism and said support.

4. A motion picture machine having an operating head, a shutter positioned at the rear of said head, a shaft for supporting and rotating said shutter, means for supporting said shaft in operative relation to the driving mechanism of said head, a demountable casing on said head and surrounding said mechanism, a guard for said shutter, a spider suporting said guard and mounted on the shaft supporting means and framing and gate adjusting shafts mounted on said spider.

5. A motion picture machine having an operating head, a shutter positioned at the rear of said head, a shaft for supporting and rotating said shutter, a guard for said shutter, and a shaft supporting member engaging with said head at a plurality of points spaced apart, and a light screen or guard carried by the shutter guard, said shutter guard being supported on the shaft supporting member.

6. A motion picture machine having an operating head, a shutter positioned at the rear of said head, a shaft for support and rotating said shutter, a shutter guard, a partition on said head, a casting fastened to the partition at widely spaced points and an enlarged bearing at one end of the casting, a hub fastened to said bearing and supporting the shutter guard thereon, shims to adjust the hub with respect to the bearing portion, a light guard supported on the shutter guard, a demountable casing on said head and surrounding the mechanism, and framing and adjusting shafts mounted on the shutter guard on side of the head.

7. In a motion picture apparatus adapted for operating a shutter at the front of the apparatus and having a partition supporting the driving and other mechanisms therefor, a support member detachably fastened to the partition, said member having a shutter shaft supporting portion located away from the partition to clear said mechanisms and permit the shutter shaft to extend to the other end of the apparatus, said supporting means constructed for the extension of said shaft to the front of the head to support a shutter thereon when desired.

8. In a motion picture projecting machine comprising a projection head a partition thereon, a driving mechanism mounted on said partition, a casting fastened to said partition at widely separated points and extending over said mechanism in order to clear the same, journals at the ends of said casting, a shutter shaft disposed in said journals, and a spider carried by said casting at one end thereof and adapted to support a guard for a shutter for said machine.

9. In combination a motion picture projection machine adapted for front shutter operation and having a shutter driving mechanism, a support attachable to said machine, an auxiliary shutter shaft mounted on said support and extending to the rear of the machine, and means for connecting said auxiliary shutter shaft to said shutter driving mechanism.

10. In combination, a motion picture projecting machine adapted for front shutter operation and having means for driving and framing a front shutter, a support mounted on said machine, an auxiliary shutter shaft on said support extending to the rear of the machine to carry a shutter for operation at the rear of said machine, said shaft having a driving connection with the regular driving mechanism of said machine so as to have the assembly or framing adjustments of the front shutter and driving mechanism therefor transmitted to said rear shutter.

11. In a motion picture projecting machine a combination of a central supporting partition, a gear train mounted on said partition for moving a film through said machine and for driving a shutter in synchronous operation therewith, said gear train and said shutter being capable of adjustment for assembly and for framing of said shutter, an auxiliary shaft mounted to project from the rear of said machine, means for mounting said auxiliary shaft for engagement with said shutter driving and adjusting mechanism, and a shutter mounted on said auxiliary shaft.

12. In a motion picture apparatus adapted for operating a shutter at one end of the apparatus and having a partition supporting the driving and other mechanisms therefor, a support member detachably fastened to the partition, said member having a shutter shaft supporting portion located away from the partition to clear said mechanisms and permit the shutter shaft to extend to the other end of the apparatus.

13. In a motion picture apparatus adapted for operating a shutter at one end of the apparatus and having a partition supporting the driving and other mechanisms therefor, a support member detachably fastened to the partition, said member having a shutter shaft supporting portion located away from the partition to clear said mechanisms and permit the shutter shaft to extend to the other end of the apparatus, and a plurality of separately spaced shaft supporting journals disposed along said shutter shaft supporting portion.

14. In a motion picture apparatus adapted for operating a shutter at one end of the apparatus and having a partition supporting the driving and other mechanisms therefor, a support member detachably fastened to the partition, said member having a flared portion to cover and clear part of the driving mechanism disposed on said partition and a plurality of separately spaced shaft supporting journals disposed along said flared portion.

15. In a motion picture apparatus adapted for operating a shutter at one end of the apparatus and having a partition supporting the driving and other mechanisms therefor, a supporting member detachably fastened to the partition, said member having a shutter shaft supporting portion located away from the partition to clear said mechanisms and permit the shutter shaft to extend to the other end of the apparatus, one end of said supporting member being enlarged to form a bearing portion to support another element than the shutter shaft.

16. In a motion picture apparatus adapted for operating a shutter at one end of the apparatus and having a partition supporting the driving and other mechanisms therefor, a supporting member detachably fastened to the partition, said member having a shutter shaft supporting portion located away from the partition to clear said mechanisms and permit the shutter shaft to extend to the other end of the apparatus, one end of said supporting member being enlarged to form a bearing portion to support another element than the shutter shaft, said shutter shaft supporting portion of said member being flared to cover and clear at least part of the driving and other mechanisms disposed on the partition.

17. In a motion picture apparatus adapted for operating a shutter at one end of the apparatus and having a partition supporting the driving and other mechanisms therefor, a support member detachably fastened to the partition at widely spaced points and formed with an upper flat portion engaging the partition, another portion of said support member flared to cover and clear at least part of the driving mechanism disposed on the partition, said flared portion provided with a lower edge portion spaced from the partition to support a shaft in line to clear the mechanism, spaced journals on said lower edge portion, one end of said support member being enlarged to provide a bearing portion for the support of an element other than the shutter shaft.

AUGUSTO DINA.